UNITED STATES PATENT OFFICE.

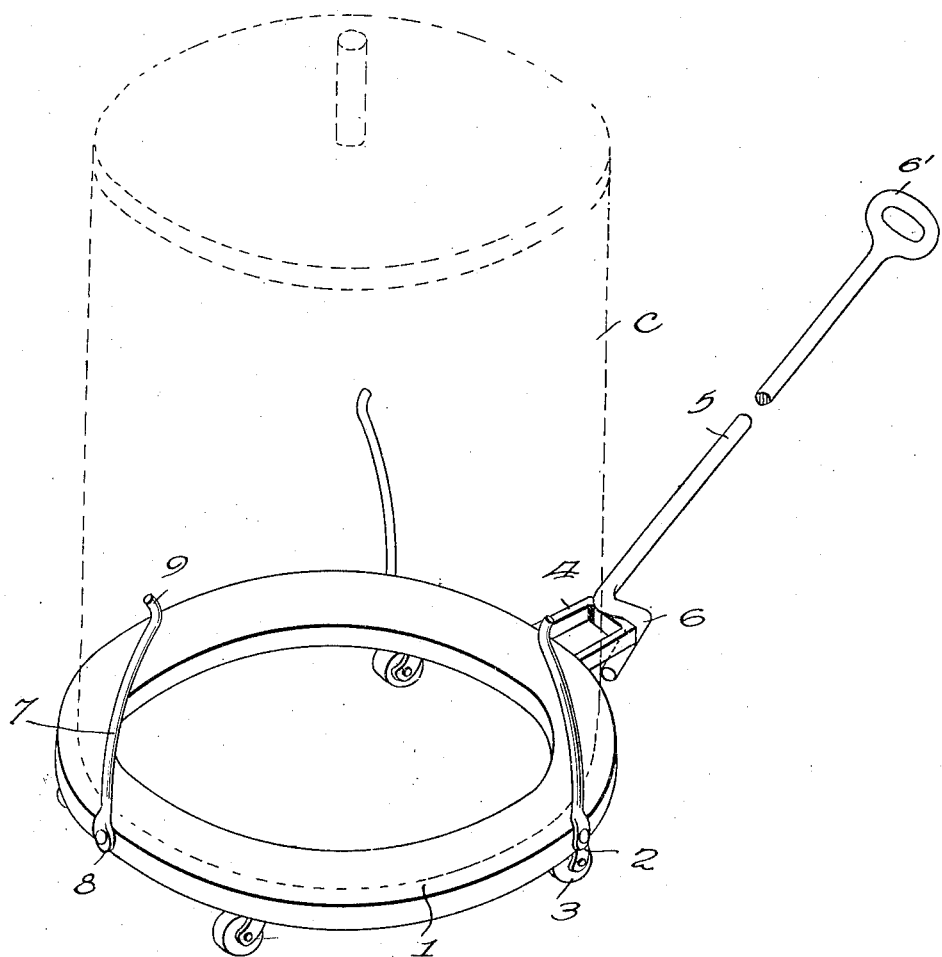

SULA BUIE, OF COMMERCE, TEXAS.

CHURN-TRUCK.

1,321,713.   Specification of Letters Patent.   Patented Nov. 11, 1919.

Application filed May 14, 1917. Serial No. 168,445.

*To all whom it may concern:*

Be it known that I, SULA BUIE, a citizen of the United States, and resident of Commerce, in the county of Hunt and State of Texas, have invented certain new and useful Improvements in Churn-Trucks, of which the following is a specification.

This invention relates to trucks and it is the dominant object of the invention to provide a conveyance for receiving churns in order that the same can be easily and readily moved to various places as it is desired or becomes necessary; the truck being provided with means for facilitating pushing or pulling thereof.

Another object of the invention is to provide a truck with means for detachably securing the churn thereto, thus, preventing accidental displacement of the churn and the wasting of its contents.

Other and further improvements and novel details in the construction and arrangement of parts will be appreciated from the description to follow, which, for a clear understanding of the invention should be considered in connection with the accompanying drawings forming a part hereof and wherein the preferred embodiment of the invention is shown for the purpose of illustration.

In the drawing there is shown a perspective of my improved truck, the churn being shown in dotted lines thereon.

Referring now more specifically to the drawings and in connection with which like reference characters will refer to corresponding parts 1 designates the body of the truck comprising a circular element formed of metal, wood or other suitable material. To the bottom side of the body 1, bearing brackets 2 are fixedly secured and have journaled therebetween wheels or rollers 3, the same serving for an obvious purpose.

To facilitate the moving of the truck from place to place a substantially U-shaped bracket 4 is secured to the forward portion of its peripheral edge and is adapted to be engaged by a rod 5 having an angular arm 6 formed upon one end thereof and a handle 7 formed upon its remaining end. Obviously, the offset arm 6 is so bent as to permit the rod to be engaged with the bracket 4 in a manner to allow pulling of the truck and also in a manner to permit the same to be readily pushed as shown in the figure. The terminal of the arm is directed angularly in substantially parallel relation to the body of the rod as indicated at 6ª and is adapted to engage the under side of the circular body 1 when the terminal of the rod is slipped through the U-shaped bracket 4 so as to support the rod in an elevated position.

Upon the sides or peripheral edge of the body 1 a plurality of spring arms 7 having certain of their ends slotted as at 8 and the other end curved as at 9 are secured, these springs serving as means for detachably securing the body of an ordinary churn thereto and thereby preventing accidental displacement of the same or the wasting of the contents.

From the foregoing, it will be appreciated that with my improved truck a churn or other similar device may be readily carried from place to place as it becomes necessary, thus, eliminating the necessity of lifting the same. Further, the truck due to the provision of a handle may be either pushed or pulled as may be convenient to the operator and may be moved into limited space.

Manifestly, the construction shown is capable of considerable modification and such modification as is within the scope of my claims, I consider within the spirit of my invention.

I claim:

1. A truck including a body, wheels secured to said body, a substantially U-shaped horizontally disposed bracket rigidly secured to the body, and a rod having an offset end removably engageable with said bracket as and for the purpose set forth.

2. A truck including a body, wheels supporting said body, a substantially U-shaped bracket having its legs rigidly secured to said body, and a rod provided with an angularly disposed end engageable with either of the legs or the web portion of the bracket to facilitate transportation of the truck.

3. A truck including a body, wheels supporting said body, a substantially U-shaped bracket secured to the forward portion of said body, and a rod having one end provided with an angularly disposed arm and an extension carried thereby, said arm being engageable against or within the bracket for either pushing or pulling the truck.

4. A truck including a body, wheels supporting said body, a substantially U-shaped bracket secured to the forward portion of the body, and a rod having one end provided with an angularly disposed arm and an extension carried thereby, said arm being engageable against or within the bracket for either pushing or pulling the truck, and an angular extremity carried by the arm disposed in approximate parallel relation to the rod and engageable with the annular body to support the rod in an elevated position.

In testimony whereof, I affix my signature hereto.

SULA BUIE.

Copies of this patent may be obtained for five cents each, by addressing the "Commissioner of Patents, Washington, D. C."